United States Patent [19]

Sundholm

[11] 3,752,367

[45] Aug. 14, 1973

[54] PLUNGER ASSEMBLY FOR HAND-OPERATED GREASE GUN

[76] Inventor: Edwin P. Sundholm, P.O. Box 108A, R.R. No. 1, Albert City, Iowa 50510

[22] Filed: June 26, 1972

[21] Appl. No.: 266,448

[52] U.S. Cl............ 222/256, 222/260, 222/326, 222/386
[51] Int. Cl............................................. G01f 11/00
[58] Field of Search.................... 184/45, 105 A; 92/130, 194; 222/256, 260, 261, 326, 327, 336, 386, 387, 389, 390, 391

[56] References Cited
UNITED STATES PATENTS

| | | | |
|---|---|---|---|
| 2,886,215 | 5/1959 | Klein et al. | 222/326 X |
| 2,958,445 | 11/1960 | Jesse | 222/386 |
| 3,612,359 | 10/1971 | Sundholm | 222/386 X |

Primary Examiner—Samuel F. Coleman
Assistant Examiner—Larry Martin
Attorney—Dawson, Tilton, Fallon & Lungmus

[57] ABSTRACT

A plunger assembly for use in hand operated grease guns which have a cylindrical grease container with a rod extending axially therein and which are adapted for use with both bulk-filled and cartridge-packaged greases; said plunger assembly comprises a cylindrical sleeve with a bore therethrough carrying a sealing ring to provide a sliding, grease-tight seal with said rod, a guide assembly rigidly mounted on said sleeve which receives and secures an annular flexible sealing means with rearwardly extending sidewalls and a plunger cup slidably mounted on said rod which engages said sidewalls in operation to urge them outward by a pivotal flexing action to selectively provide a sliding, grease-tight fit around the outside of the plunger assembly.

6 Claims, 7 Drawing Figures

Patented Aug. 14, 1973

Patented Aug. 14, 1973 3,752,367

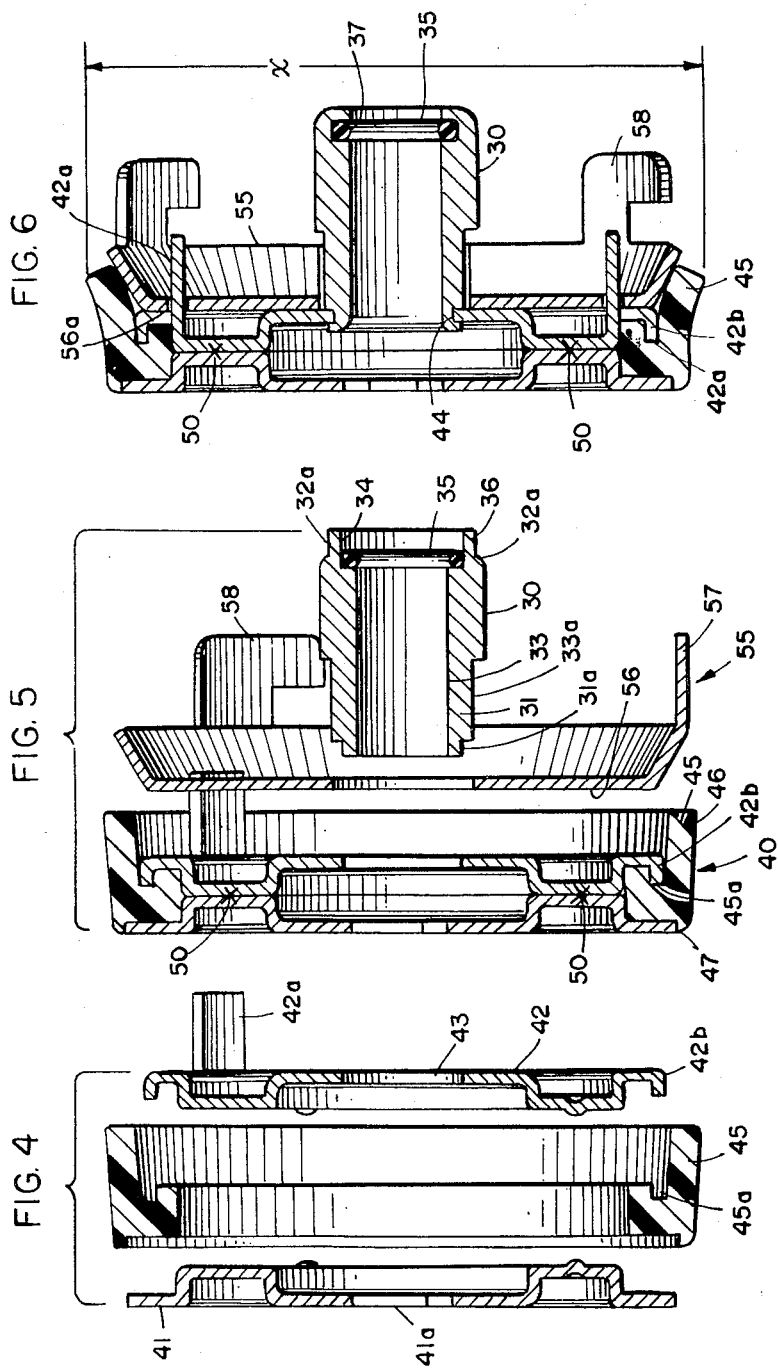

PLUNGER ASSEMBLY FOR HAND-OPERATED GREASE GUN

BACKGROUND AND SUMMARY

This invention relates to a new and different plunger assembly for hand-operated grease guns. The plunger assembly is adapted for use with a plunger rod extending axially therein; the plunger assembly is slidably mounted on the rod and is adapted to provide a sliding, grease-tight fit around the outer periphery of the plunger assembly. The assembly of the present invention may be used with particular advantage because it allows the use of and is equally effective with either bulk-filled (through pressure loading or suction filling) or cartridge-packaged greases interchangeably in the same gun.

It has been previously suggested to utilize the plunger spring and rear washer to urge the sealing member outwardly into engagement with the wall of the cartridge or grease-gun barrel (see Jernander U.S. Pat. No. 2,941,854). However, a compression or squeezing action on the sealing lip of the rubber plunger member has a number of functional limitations. The variation in diameter of the plunger is dependent on the compressibility of the rubber, and, further, the rubber when compressed tends to take a "set," so that it does not readily adjust from the expanded diameter of the grease gun barrel to a restricted diameter for insertion in a cartridge. Moreover, the spring pressure against the rear washer could not be released when it was desired to facilitate the insertion of the plunger in the end of a grease cartridge. These limitations are accentuated by ambient temperature variations, the changes in diameter of the squeezed or compressed rubber being more difficult to accomplish in cold weather.

Generally, such a plunger assembly comprises a cylindrical sleeve with a bore therethrough carrying a sealing ring to provide a sliding grease tight fit around the aforementioned rod to which it is slidably mounted. A guide assembly is rigidly mounted on the sleeve which receives and secures an annular flexible sealing means having rearwardly extending sidewalls. Rearward of the guide assembly is a plunger cup mounted on the rod which engages the sidewalls in operation. When so engaged the sidewalls are urged outward by a pivotal flexing action to selectively provide a sliding grease-tight fit around the outside of the plunger assembly.

THE DRAWINGS

FIG. 4 is a side sectional view of a preferred embodiment of the base plate, cover plate and annular flexible sealing means in separated relation, which comprises part of the plunger assembly of the present invention;

FIG. 5 is a side sectional view of the components of FIG. 4 in attached relation with a preferred embodiment of the plunger cup and cylindrical sleeve of this invention in a separated relation;

FIG. 6 is a side sectional view of the components of FIG. 5 with the cylindrical sleeve attached to the cover plate and the plunger cup slidably mounted on the cylindrical sleeve.

DETAILED DESCRIPTION

Figure 1:
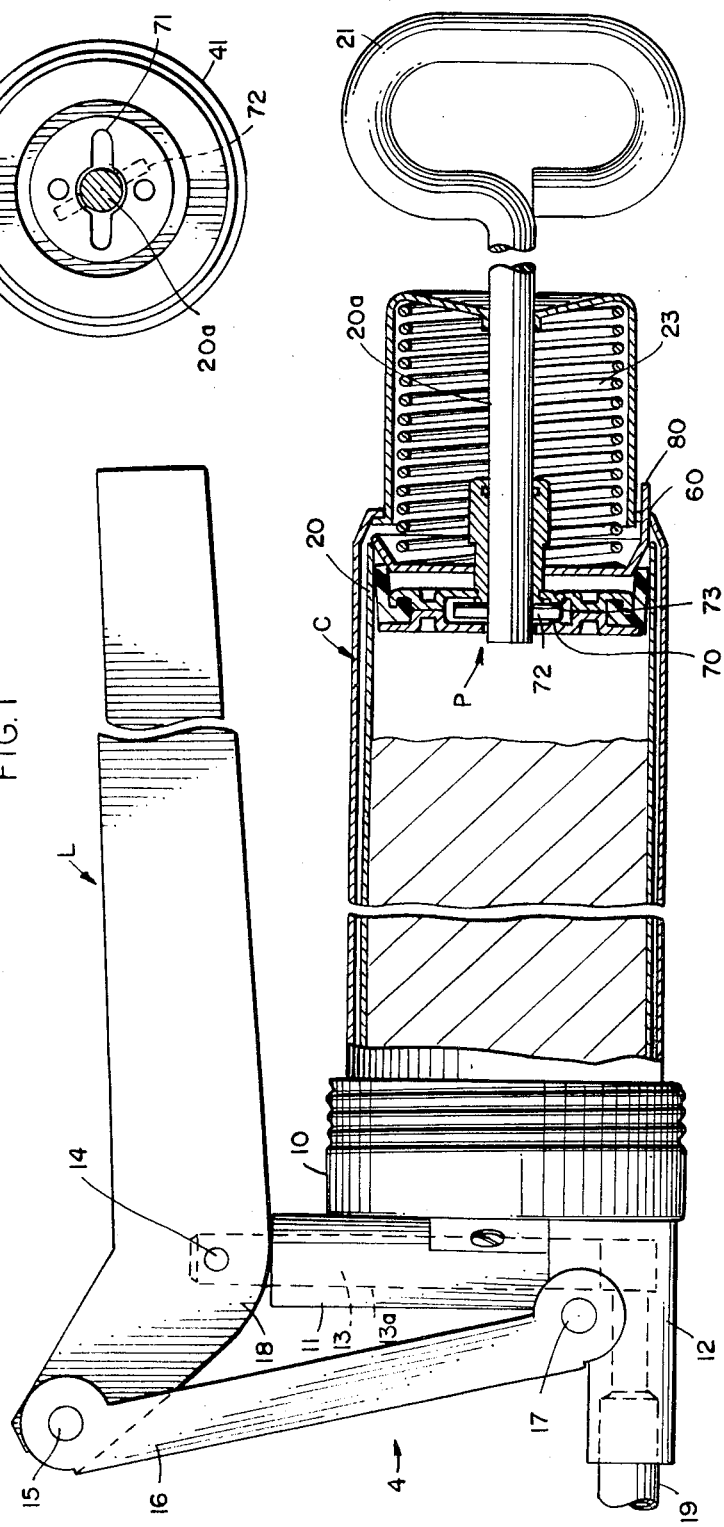
FIG. 1 is a fragmentary side elevation partially in section showing the plunger assembly of the present invention in retracted position within the barrel of a grease gun loaded with a grease cartridge.
Figure 7:
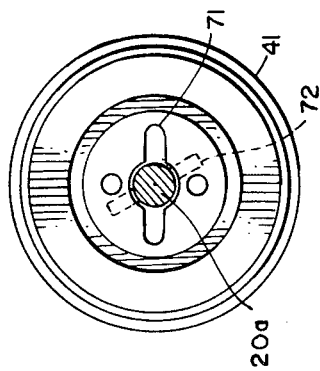
FIG. 7 is a detailed view of the base plate of the plunger assembly showing the bayonet latch and housing.

Referring first to FIG. 1 there is shown a hand-operated grease gun which includes a grease container C, a plunger assembly D mounted within the container C for urging grease contained therein (either as bulk-filled or cartridge-type) toward the forward (left as viewed in the drawing) end thereof, and a dispensing head H actuated by a lever L. Although it does not form a part of the present invention, the dispensing head H includes a cap 10 for threadably receiving the container C, a high pressure cylinder 11, and a housing 12 for an outlet check valve. A piston 13 is connected to the hand lever L at an intermediate location 14; and the end of the lever L is pivotally connected at 15 to a link 16, the other end of which is pivotally connected at 17 to the housing 12. The lever L is cut out as at 18 so that when the lever L is actuated the portion thereof abutting the cylinder 11 will deform slightly thereby preventing deformation of the bore 13a which holds the piston 13. A pipe 19 is connected to the housing 12 for the outflow of grease to an adapter (not shown). In operation, one hand is placed on the container C and the other hand operates the lever L to reciprocate the piston 13 in the high pressure cylinder 11 to force grease through the check valve in the housing 12 and the pipe 19. Grease is admitted into the high pressure cylinder 11 by means of a part communicating the interior of the cylinder C with the bore 13a of the piston 13 when that piston is retracted. Further details on this preferred dispensing head may be obtained from my application for Dispensing Head for Lever Operated Hand Grease Gun, Ser. No. 854,581, filed Sept. 2, 1969 and allowed July 16, 1971.

The hand-operated grease gun of FIG. 1 is shown with a grease cartridge 20 received in container C. The cartridge 20 is a cylindrical paperboard container holding grease throughout its length except for a rear portion of about one-half inch to facilitate insertion of the plunger assembly P without spilling. As shown in FIG. 1, the cartridge 20 is in a fully inserted position; and the cap 10 of the dispersing head H is tightly secured to the container C.

A plunger rod 20 extends axially of the container C and through the back thereof where it is formed into a loop handle 21. The plunger assembly P is slidably mounted on the rod 20a; and urged to a forward position (i.e., toward dispensing head H) by means of a coil spring 23 interposed between the rear of the container C and the plunger assembly P.

Turning now to the remaining Figures the plunger assembly will be described in greater detail. The plunger assembly is generally referred to by the numeral 25 (see FIGS. 2–3). Such an assembly comprises a cylindrical sleeve 30, a sealing ring 35 carried by the sleeve 30 (see FIG. 5–6), a guide assembly 40 which includes a base plate 41 and a cover plate 42, an annular flexible sealing means 45, engaging means 50 for attaching the plate 41 and 42, and a plunger cup 55.

Referring specifically to FIGS. 4–6, the construction of the plunger assembly will be more fully described. The cylindrical sleeve 30 has a forward end 31 and a rearward end 32; additionally it provides a bore 33 therethrough for slidably receiving the axial rod 20a. The sleeve ends 31 and 32 are notched as at 31a and 32a; the former notch 31a is to allow a secure crimping fit of the sleeve to the cover plate 42 later to be described, while the latter notch 32a allows a crimping of the sealing ring 35 within the sleeve 30 to provide a sliding grease-tight fit with the axial rod 20a. The sleeve 30 also provides a recess 33a which is adapted to provide a sliding contact with the plunger cup 55.

Referring again to the sealing ring 35, in one preferred embodiment of the present invention the ring 35 is an O-ring positioned in an internal cylindrical space 34 fashioned in the rearward end 32 of sleeve 30; the space 34 has transverse dimensions substantially equal to the external dimensions of the O-ring 35 and has a height dimension greater than the height dimension of O-ring 35. When combined with the rearward end notch 32a the outer wall 36 adjacent to the O-ring 35 can be crimped over the O-ring 35 to provide a sliding, gresse tight fit with the axial rod 21a. Such a connection is shown in FIG. 6 by the numeral 37. The O-ring itself is preferably molded from a flexible, resiliant synthetic rubber such as neoprene.

The guide assembly 40, as noted, includes a base plate 41 and a cover plate 42. These plates are positioned (as best shown in FIG. 4) in a face-to-face relationship and are adapted to cooperatively receive and secure the annular flexible sealing means 45 which is positioned between the plates when they are attached.

The cover plate 42 has an opening 43 through its center for receiving and securing the forward end portion 31 of the sleeve 30. The opening 43 is conveniently adapted to mate with the notched end 31a of sleeve 30; in this embodiment a secure connection 44 (see FIG. 6) can be provided by a crimping of the notched section 31a. It may also be convenient to simultaneously form connections 44 in the forward end 31 of sleeve 30 with connection 37 around the sealing O-ring 35 as previously described. This could be done by a simultaneous, opposed pressure crimping to form the two connections.

In one preferred embodiment, the cover plate 42 has at least one indexing means 42a attached to and extending rearwardly from the cover plate. This indexing means 42a is adapted to be received within a slot 56a in the plunger cup base 56, to be more fully described later. When so mated, this construction prevents the plunger cup 55 and cover plate 42 (and thereby the entire guide assembly 40) from turning relative to each other.

The base plate 41 also provides a central opening 41a which is concentric with opening 43 in cover plate 42 for slidably receiving the axial rod 20a. In the preferred embodiment the opening 41a would be of smaller transverse dimensions than opening 43 because opening 43 receives the forward end 31 of sleeve 30 while opening 41a receives only rod 20a. Of course other embodiments could provide different constructions and still not depart from the invention disclosed herein; such constructions would be well known to those acquainted with the prior art.

As shown in FIGS. 5 and 6, the plates are attached by a plurality of spot welds 50; of course any engaging means would suffice provided that the plates 41 and 42 are securely connected.

When the plates are attached, an annular flexible sealing means 45 is cooperatively received and secured between them. The sealing means 45 has an annular flexible portion 46 which extends rearwardly along the outer edge of the guide assembly 40. This trailing portion 46 ultimately provides the grease-tight seal around the plunger assembly 25 as will be described in detail later. The sealing means 45 can be made of any flexible material as long as it is resistant to grease and is capable of forming a sliding grease-tight seal with the container C.

Rearwardly of the attached plates I position a plunger cup 55 which is slidably mounted on said sleeve 30, conveniently in the aforementioned recess 33a. The cup 55 has a base 56 whose transverse dimensions are substantially equal to the transverse dimensions of cover plate 42. It also provides outwardly levelled and rearwardly extending sidewalls 57 which are concentric with sleeve 30. When pushed by the action of spring 23, the cup actuates the guide assembly to provide the sliding grease-tight fit essential for efficient grease gun operation. The precise mechanism of this action will be more fully discussed later.

In one preferred embodiment of the plunger cup 55 at least one locking flange 58 extends rearwardly from the top of the sidewall 57. These flanges 58 are designed to cooperatively engage the grease container C at the rear cap 6 (see FIG. 2) to demountably hold at reast plunger cup 55 so that it does not effectively touch the rearwardly extending portion 46 of the annular flexible sealing means 45. The cap 61 provides a slot which receives flange 58; when so received the assembly can be rotated so that flange 58 engages cap 61. The use of the mated connection allows the gun to be stored without grease seepage due to continual pressure from spring 23.

As discussed previously, another preferred embodiment of cup 55 has a slot 56a in the base 56. As the cup 55 is pressed forward into a closer relation with cover plate 42 the indexing means 42a is pushed progressively further into slot 56a. I design this connection by providing a recess 33a on sleeve 30 such that the cup base 56 is never completely disengaged from the indexing means 42a in slot 56a. As such, the plunger cup 55 and the guide assembly 25 cannot turn relative to each other but must turn in container C substantially in unison. The forwardly-turned annular lip 42b (FIGS. 4–6) of plate or washer 42 is received in annular recess 45a of sealing means 45, which securely locks the sealing means in the latched relation, as shown in FIG. 5.

Having described the construction of the plunger assembly, I will now describe its operation and beneficial results in grease guns which can alternately employ bulk-filled or cartridge-packaged greases. Referring first to FIG. 1, a grease gun utilizing cartridge-packaged grease is shown. In this view both the plunger assembly 25 and the axial rod 20a are in retracted or rest position prior to use. The plunger assembly 25 is held in place by the connection 60 between the locking flange 58 and container C. The axial rod 20a is so positioned by means of a connection 70 shown best in FIG.

7. The base plate 41 has a slot 71 concentric with its base. The rod 20a has bayonet latches 72 generally normal to rod 20a. The rod 20a can be retracted into the recess 73 between the plates 41 and 42 (see FIG. 1) and turned so as to prevent the rod 20a from pushing through slot 71 and onward into the remainder of container C.

Figure 2:
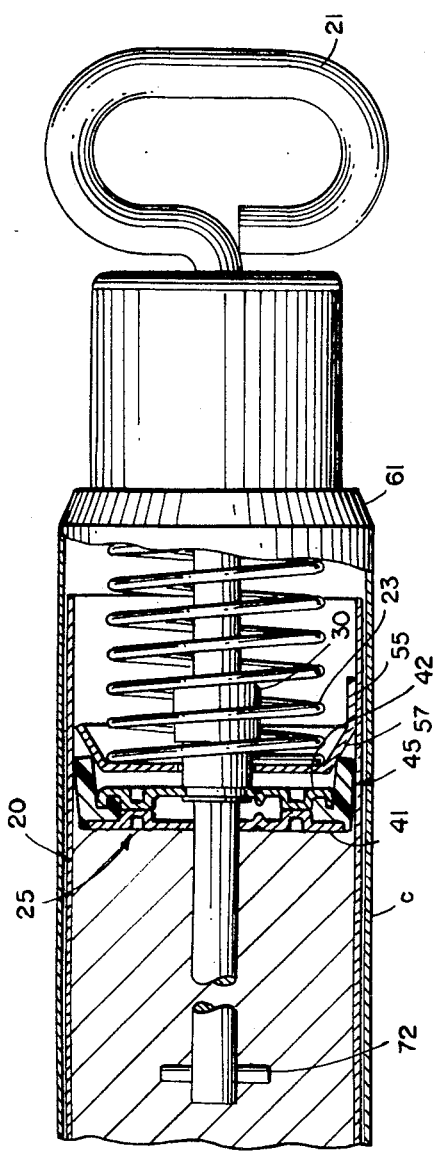
FIG. 2 is a fragmentary side elevational view of the grease gun of FIG. 1 partially in section showing the plunger assembly in forward position with the plunger rod inside the barrel during dispensing of cartridge-filled grease.

Turning now to FIG. 2, the same grease gun with cartridge 20 is shown in the position of use. The axial rod 20a has been turned via handle loop 21 so that the bayonet flanges 72 correspond to slot 71 in base plate 41, and rod 20a is pushed into container C. Thereafter plunger assembly 25 is turned so that the locking flange 58 is disengaged from container C. The spring 23 then urges the plunger cup 55 into a closer relation with cover plate 42. As this happens the sidewall 46 of sealing means 45 is first unaffected, thereby allowing the plunger assembly 25 to be easily inserted within the cartridge 20; thereafter the outwardly levelled and rearwardly extending sidewalls 57 of cup 55 urge outwardly the rearwardly extending portion 46 of annular flexible sealing means 45. This urging is accomplished by a pivotal flexing action of sealing means sidewall 46 to provide a sliding grease-tight fit around the outside of plunger assembly 25 within grease container 20. In this embodiment, I adapt the plunger cup 55 so that its base 56 never actually touches the cover plate 42.

Figure 3:
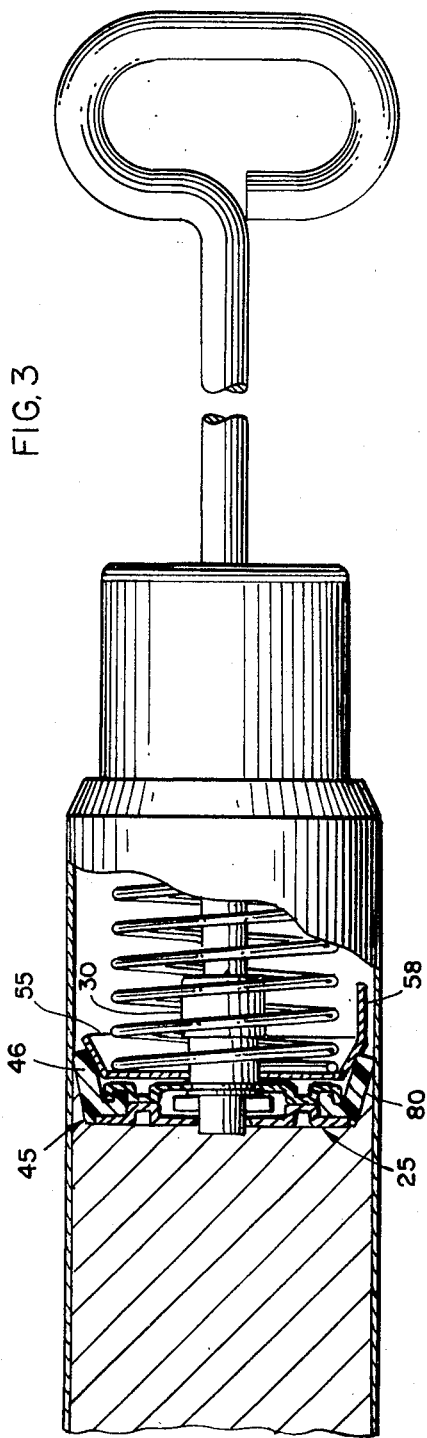
FIG. 3 is a fragmentary side elevational view of the grease gun of FIG. 1 partially in section showing the plunger assembly in forward position prior to inserting the plunger rod fully into the barrel containing bulk-filled grease.

Looking now at FIG. 3, the grease gun is shown employing bulk-filled grease within container C. The plunger assembly 55 has pushed into contact with the grease, but the rod 20a has not yet been pushed into container C. The same general sealing operation occurs in the embodiment as was described previously. The rearwardly extending portion 46 of sealing means 45 is urged outwardly by the pressure of the outwardly beveled and rearwardly extending sidewalls 57 of cup 55. As shown in FIG. 3, this causes a flexible pivoting action in sealing means 45, as at 80.

Generally, then, the sidewalls 46 of sealing means 45 are flexibly pivoted outward by cup sidewall 57 to form a sliding, grease-tight seal around the plunger assembly 25. As more pressure is applied to the plunger cup 55, the pivoting action of sealing means sidewall 46 increases the transverse dimensions (shown as $x$ in FIG. 6) of the plunger assembly 25 to desired proportions. Depending upon the desired use, i.e., with bulk-filled or cartridge greases, this action can selectively provide a grease tight fit. As shown in FIGS. 2–3, use of a cartridge 20 will require a smaller transverse dimension $x$ than will bulk-filled greases.

From what has been set out above, it will be apparent to those skilled in the art that the grease gun plunger of this invention involves an entirely new method of functioning. The rearwardly-extending annular lip 46, provided by the sealing member 45, is flexed and positioned over a range of external diameters by means of the engagement with the cup sidewall 57. Instead of being compressed, the rubber of the annular lip 46 is stretched circumferentially as the lip pivots outwardly from a smaller to a larger diameter. This action provides effective variation in diameter from the enlarged diameter required for a grease-tight seal with the interior of the barrel to the restricted diameter required for insertion in a grease cartridge. Since the pivoting and stretching action is positive, and does not depend on the compressiblity of softness of the rubber, the expanding and contracting action is not subject to ambient temperature variations. Further, long use of the plunger assembly with the grease cartridge does not lead to a "set," which interferes with expansion for use with bulk-fill greases. Another important feature is that the rear plunger cup 55 can be completely disengaged from pressure-contact with the sealing lip 45 by engaging the latching flanges 58, as shown in FIG. 1. When so latched, the spring 23 is held in compressed condition, and does not exert pressure against the inside of annular lip 45 through rear cup 55.

Another important feature is that the annular lip 42b of plate or washer 42 anchors the sealing member 45 against lateral expansion. Lateral expansion or contraction of the sealing member may tend to occur due to temperature variations, and also due to contact of the rubber material of the sealing means with components in particular greases. As will be appreciated, it is desirable to minimize such expansion or contraction, and thereby provide more effective sealing at the required specific diameters for sealing with the internal surfaces of the grease gun cylinder, and/or with the internal surfaces of the grease cartridges.

I claim:
1. In a hand-operated grease gun of the type having a cylindrical grease container with a rod extending axially therein, said grease gun being adapted for use with both cartridge-packaged greases and bulk-filled greases, the plunger assembly therein which comprises:
  a. a cylindrical sleeve having a forward end and a rearward end and providing a bore therethrough for slidably receiving said rod;
  b. a sealing ring carried by said sleeve providing a grease-tight seal with said rod;
  c. a guide assembly rigidly mounted on the forward end portion of said sleeve, said assembly comprising a base plate and a cover plate positioned in a face-to-face relationship and adapted to cooperatively receive and secure an annular flexible sealing means positioned therebetween when said plates are attached to each other, said cover plate having an opening centrally therethrough for receiving and securing said forward end portion of said sleeve, said base plate having an opening centrally therethrough concentric with said opening in said cover plate for slidably receiving said rod;
  d. engaging means for attaching said base plate and said cover plate in a face-to-face relationship;
  e. annular flexible sealing means cooperatively received and secured between said plates when attached, said annular sealing means having an annular flexible portion extending rearwardly along the outer edge of said guide assembly;
  f. a plunger cup slidably mounted on said sleeve, said cup having a base whose transverse dimensions are substantially equal to the transverse dimensions of said cover plate and having outwardly bevelled and rearwardly extending sidewalls concentric with said sleeve such that when said cup base is pushed into a close relationship without touching said cover plate, said sidewalls urge outwardly said rearwardly extending portions of said annular sealing means by a pivotal flexing action to provide a sliding, grease-tight fit around the outside of said plunger assembly.

2. The plunger assembly of claim 1 wherein said cover plate has at least one indexing means attached thereto extending rearwardly from said cover plate with at least one slot in said plunger cup base designed to receive said indexing means, thereby preventing said plunger cup and said guide assembly from turning relative to each other.

3. The plunger assembly of claim 1 wherein said plunger cup sidewalls have at least one locking flange extending rearwardly from the top of said sidewalls, said locking flanges designed to cooperatively engage said grease container to demountably hold at rest said plunger cup so that it does not effectively touch said rearwardly extending portion of said annular sealing means.

4. The plunger assembly of claim 1 wherein said sealing ring is an O-ring positioned in an internal cylindrical space fashioned in the rearward end of said sleeve, said space having transverse dimensions substantially equal to the external dimensions of said O-ring and having a height dimension greater than the height dimension of said O-ring such that the adjacent outer wall of said sleeve can be crimped to securely hold said O-ring to provide a sliding, grease-tight fit with said rod.

5. The plunger assembly of claim 1 wherein said engaging means is a series of spot welds between said plates.

6. In a plunger assembly for use in a hand-operated grease gun which has a cylindrical grease container with a rod extending axially therein and which is adapted for use with both bulk-filled and cartridge-packaged greases, the plunger assembly which includes a cylindrical sleeve with a bore therethrough carrying a sealing ring to provide a sliding grease-tight seal with said rod, a guide assembly rigidly mounted on said sleeve which receives and secures an annular flexible sealing means with rearwardly extending sidewalls and a plunger cup slidably mounted on said rod which engages said sidewalls, the improvement which comprises an annular flexible sealing means whose rearwardly extending sidewalls are urged outwardly by said plunger cup by a pivotal flexing action to selectively provide a sliding, grease-tight fit around the outside of said plunger assembly.

* * * * *